(12) United States Patent
Bartl et al.

(10) Patent No.: US 7,306,725 B2
(45) Date of Patent: Dec. 11, 2007

(54) DEVICE FOR TREATING WATER

(75) Inventors: Ludwig Bartl, Constance (DE);
Andrew Cookson, Kreuzlingen (CH);
Karel Stefka, Brno (CZ)

(73) Assignee: REV22AG, Kreuzlingen (CH)

( * ) Notice: Subject to any disclaimer, the term of this patent is extended or adjusted under 35 U.S.C. 154(b) by 426 days.

(21) Appl. No.: 10/507,459

(22) PCT Filed: Mar. 13, 2003

(86) PCT No.: PCT/EP03/02613

§ 371 (c)(1),
(2), (4) Date: Sep. 10, 2004

(87) PCT Pub. No.: WO03/076347

PCT Pub. Date: Sep. 18, 2003

(65) Prior Publication Data

US 2005/0161333 A1    Jul. 28, 2005

(30) Foreign Application Priority Data

Mar. 13, 2002  (DE) .......................... 202 04 084 U

(51) Int. Cl.
C02F 1/467 (2006.01)
C02F 1/48 (2006.01)

(52) U.S. Cl. ...................... 210/243; 204/660; 204/271; 204/288

(58) Field of Classification Search ................ 210/746, 210/748, 764, 143, 198.1, 205, 243; 422/186.3; 204/660, 661, 555, 556, 228.6, 289, 288, 204/271; 205/742, 743, 744, 751
See application file for complete search history.

(56) References Cited

U.S. PATENT DOCUMENTS

| | | | | | |
|---|---|---|---|---|---|
| 1,862,663 | A | * | 6/1932 | Curtis | ......................... 204/271 |
| 4,481,096 | A | * | 11/1984 | Okazaki | ...................... 204/265 |
| 5,328,584 | A | * | 7/1994 | Erickson et al. | ............. 205/743 |
| 5,476,595 | A | * | 12/1995 | Baddour et al. | ............ 204/273 |
| 5,744,028 | A | * | 4/1998 | Goto et al. | .................. 210/181 |
| 5,911,870 | A | * | 6/1999 | Hough | ........................ 205/701 |
| 6,055,859 | A | * | 5/2000 | Kozuka et al. | ................ 73/570 |
| 6,296,756 | B1 | * | 10/2001 | Hough et al. | ............... 205/744 |
| 6,860,990 | B2 | * | 3/2005 | Bartl et al. | ................. 210/143 |

* cited by examiner

*Primary Examiner*—Frank M. Lawrence
(74) *Attorney, Agent, or Firm*—Bachman & LaPointe, P.C.

(57) ABSTRACT

A device for antibacterially treating, in particular decontaminating and/or sterilizing water and for killing microorganisms in water, which device is developed to work together with a container designed for holding a quantity of water intended for treatment, and has an electrode arrangement set up for pulsing the quantity of water in the container, the electrode arrangement being connectable to and operable with an electrical signal-generating device, and the device having a discoid housing, which is preferably provided in the container in detachable or removable form, and having the electrode arrangement on at least one flat outer side of the housing, and the electrical signal-generating device in the interior of the housing.

16 Claims, 3 Drawing Sheets

DEVICE FOR TREATING WATER

BACKGROUND OF THE INVENTION

The present invention relates to a device for treating water.

Such devices, in particular for processing water by decontaminating and/or sterilizing, are generally known from prior art, and mechanical filter-based solutions exist as well as those that are based on selective triggering of electric pulses or signals in contaminated water, in order to achieve the desired treatment or cleaning effect.

Thus a device of the type is known from WO 01/55035 A2 of the applicant, the said device being suitable, by the effective signal application on the water to be cleaned as well as the inherent portability of the system, for extremely flexible use and handling, even in isolated application settings.

However, in practical use of this known device, the need also arose to make its use still more flexible, in particular also against the background of a possible use of the described decontamination principle in changing containers for holding the contaminated water. In addition, production of the device known from US 2003/0127398A1 published Jul. 10, 2003, now U.S. Pat. No. 6,860,990, is costly, and is therefore only suitable for large-batch production (from the efficiency of the system, very desirable), with correspondingly reduced costs and selling prices.

It is therefore the object of the present invention to improve a device as in the preamble for antibacterial treatment of water with a view to its being more universally usable, also in connection with various changing containers for the water, and with the scope and suitability for more efficient, potentially large-scale production.

SUMMARY OF THE INVENTION

The object is achieved by providing a device for antibacterially treating, in particular decontaminating and/or sterilizing water and for killing microorganisms in water, which device is developed to work together with a container designed for holding a quantity of water intended for treatment, and has an electrode arrangement set up for pulsing the quantity of water in the container, said electrode arrangement being connectable to and operable with an electrical signal-generating device, characterized in that the device has a discoid housing, which is preferably provided in the container in detachable or removable form, and has the electrode arrangement on at least one flat outer side of the housing, and the electrical signal-generating device in the interior of the housing.

Advantageously, according to the invention, a modular solution implementing the basic idea already known from US 2003/0127398A1 published Jul. 10, 2003, now U.S. Pat. No. 6,860,990, is produced for the first time by the present invention by means of the flat discoid housing, the discoid housing according to the invention both enabling (exchangeable) use for different containers, and also from the manufacturing properties described in the development, being favorable to very extensively automated large-scale production.

Advantageously, according to the invention, the discoid housing enables an extremely efficient provision of an effective electrode surface for the electrode arrangement on a flat outer side of the housing for one thing, while at the same time the interior of the housing offers the necessary space to hold the electrical signal generating device and the associated electronics.

The invention also covers the use of the discoid housing as an element or (base) module of a tumbler, jug or similar container for (drinking) water, said housing further preferably developed to be removable, the flat outer side with the electrode arrangement formed on it then simultaneously forming the base of this container. Alternatively covered by the invention, and a preferred embodiment, is the fixing of the discoid housing in the container by means of the holder provided in the development, immersed in the container in such a way that the quantity of water preferably washes around both flat outer sides of the housing (if applicable, each equipped with electrodes of the electrode arrangement), so that by this means an optimization can be achieved between the necessary effective outer surface of the housing for attaching the electrodes and the smallest possible housing for the present invention.

Furthermore, especially preferred within the scope of this development is the formation of the (rod-shaped) holder in such a way that necessary supply voltage and/or control signals for the electrical signal-generating device can be routed simultaneously over this. In a preferred manner, the assembly work can then be simplified, in particular as the bores that may anyway be present on the container can be used for the holder, or only one bore would then suffice for attachment. Especially preferred further is the formation of the holder in such a way that a holding and penetration depth for the housing can be set in the container and thus in the quantity of water.

In a manner that is especially favorable for production and therefore preferred, it is provided according to the development that the electrode arrangement be formed with the help of a material containing platinum (though other electrode materials are also suitable in the scope of the invention), where production technologies that can be assumed otherwise to be known, such as the attachment of an electrode pattern by screen printing or similar, have proved to be favorable. It is further preferred for production that the electrodes be arranged on a ceramic-coated (or ceramic) disc, metallic and then ceramic-coated discs in particular also being advantageous as carrier. A typical electrode width is in the range between 0.2 mm and 5 mm, the thickness then being dependent on the particular manufacturing technology selected, e.g. screen printing. The term "strip-form" within the scope of the invention implies not purely an elongated pin or linear electrode form: electrodes curved into circular or spiral forms in particular are also included in the present invention.

The electrode means has a material that is selected from the group consisting of a stainless steel alloy, iron-silicon alloy, magnesium-zinc-calcium alloy, gold, silver, palladium, platinum, titanium, carbon, graphite, a semiconductor material, a conductive synthetic material, and glass. The electrode means can be formed on one flat side of a disc element with one of plastic, Teflon, glass, aluminum oxide and ceramic, and the opposite flat side includes a means for fixing electronic components of the electrical signal-generating means. The signal-generating means is operable with low voltage and generates an electrical alternating signal between electrodes of the electrode means with a maximum amplitude<50V and a signal frequency in the range between 1 and 500 kHz, in particular 5 to 50 kHz, and having settings means for automatic changing of a maximum amplitude, an amplitude swing and/or a signal/pause ratio of the alternating signal, dependent on a conductivity of the water mass, and means preferably being provided for short-circuiting the electrodes during a pause in the electrical alternating signal.

Also within the scope of the present invention according to the development is the formation of the electrode arrangement by means of the additional dechlorination electrode for dechlorination of the quantity of water to be treated (or already treated). In practical operation, the pulsing of the electrode arrangement for decontamination leads to a release of chlorine in water containing chloride, so that the water quality in turn is affected. However, if in the manner provided in the development, a dechlorination electrode with in particular magnesium, zinc or calcium or their alloys is provided and suitably activated, possibly as specified in the subclaims, then it can advantageously be achieved that a dechlorination takes place, and the chlorine in the water is replaced instead by ions more beneficial for human consumption such as magnesium, zinc or calcium; the advantageous side-effect that is achieved by this development of the invention is then the methodical enrichment of the treated water with these elements.

While the provision of a dechlorination electrode in addition to the electrode arrangement (provided for the decontamination) is a preferred implementation of the invention, it is within the scope of invention also to implement the electrode arrangement according to the invention through the dechlorination electrode, the electrical signal-generating device according to the invention then generating the suitable signals provided for the dechlorination; in this embodiment of the invention there would be no other decontamination apart from the dechlorination.

Also within the scope of the present invention is to supply further aggregates, enabling additional water treatment steps, for the container. For one thing, the present invention covers the provision of suitable heating and cooling means in the interior of the container in such a way that an additional controlled influence can be exerted on the temperature of the water to be treated or already treated.

For another, it is within the scope of the present invention, according to the development, to provide a filter unit particularly in the region of the container's spout or in the manner of a bag (analogously to the idea of a portioned teabag), which unit functions mechanically and in particular as a one-way filter. Such a (one-way) filter unit suitably consists of a defined matrix of a porous material (a fleece or cellular material is suitable here), on which absorbent material (activated carbon, zeolite or similar is suitable) is provided, if applicable also an ion exchanger material (e.g. a Purolit for eliminating nitrates). According to the intended cleaning purpose, different variants are possible here, such as wetting of the one-way filter with magnesium, enveloping with particle catching material or similar.

In the result, in an extremely simple, elegant and easily implemented manner, the present invention achieves the underlying object of the present invention, namely to create a universally usable, easily exchangeable device which can be manufactured efficiently and economically, and with which the antibacterial treatment of water is possible in a very universal manner.

The application areas for the present invention are accordingly almost unlimited. As well as the use of the invention in containers for drinking water or comparable fluids, the present invention could be used in connection with a cistern for drinking water (e.g. for campers, caravans, boats etc.), provided for a tank for household water (showers and baths), or for any kind of industrial plants (the present invention was successfully tested, for instance, in plants for ice or soda water manufacture, for air-conditioning equipment, in connection with laser cooling devices, where algae control was the main issue, with the germicidal treatment of swimming pool water or the sterilization of instruments). The signal-generating device is then set in each case to the appropriate cleaning parameters and, just as for the use with standardized tanks, the diameter of the discoid housing according to the invention is suitably adapted to a cleaning opening of the respective containers.

BRIEF DESCRIPTION OF THE DRAWINGS

Further advantages, features and particulars of the invention arise from the following description of preferred embodiments, and with reference to the drawings; these show in FIG. 1: a longitudinal section through a closed water pot as a container with a detachable discoid housing inserted in the base according to a first preferred embodiment of the invention.

DETAILED DESCRIPTION

Figure 1:
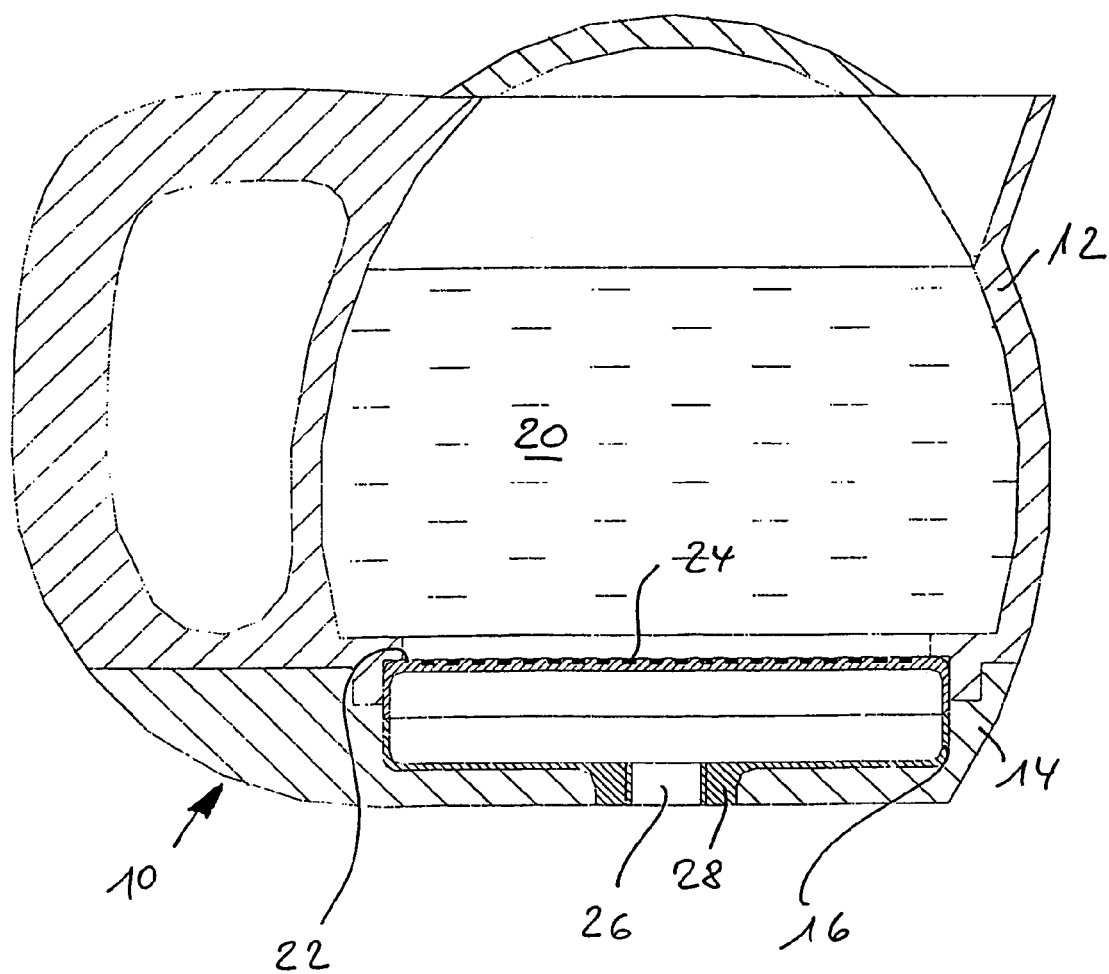

As can be seen in FIG. 1, a pot 10 as a container for holding a quantity of water consists of an upper pot part 12 and a base part 14, which can be connected together in an otherwise known manner.

Between parts 12 and 14, a cylindrical, flat (discoid) housing 16 is held gripped and detachable, which on its plane outer surface 22, open to the interior of the pot 20, has an electrode arrangement 24, which is formed in strips from a platinum material. In the embodiment shown, the outer surface 22 with the electrode arrangement 24 forms the base of the container's interior 20.

In the middle of the housing 16 an electronic component (not shown) is provided for the electrical signal-generating device assigned to the electrode arrangement 24, this device in particular, in the manner known from US 2003/0127398A1 published Jul. 10, 2003, now U.S. Pat. No. 6,860,990, (insofar as pertinent to the invention, this printed matter should be considered to be included in the present invention), generating electrical control signals for operating the electrode arrangement 24 in an antibacterial and/or decontamination operation.

On the base the cylindrical housing 16 is opened towards an opening 26, this opening 26 being formed from a ring flange housing neck 28 with an internal thread.

In an especially suitable manner, the housing, which typically has a diameter of about 100 mm for an effective housing height of about 20 mm and is made of a suitable plastic synthetic, is coated in the area of a surface 22 with a ceramic layer, on which in turn the electrode arrangement 24 is then attached, possibly by an otherwise known screen printing process with a material containing platinum.

Figure 2:
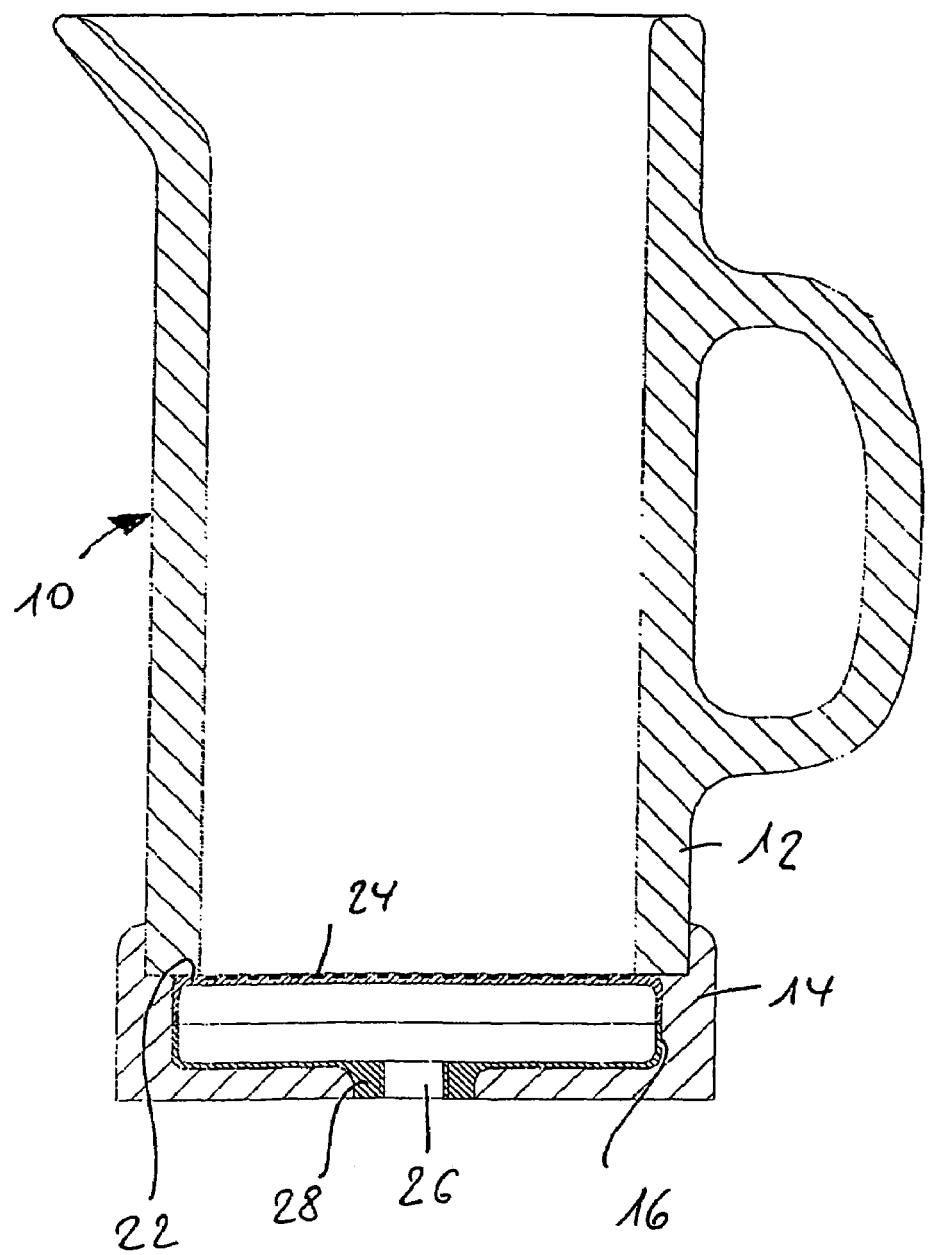
FIG. 2: a variant of the implementation form according to FIG. 1 with an alternative container as an open jug and discoid housing provided in the base to hold the electrode arrangement

FIG. 2 simply illustrates another housing variant to the arrangement in FIG. 1, and the implementation and construction of the discoid housing 16 implementing the antibacterial treatment is equivalent.

Figure 3:
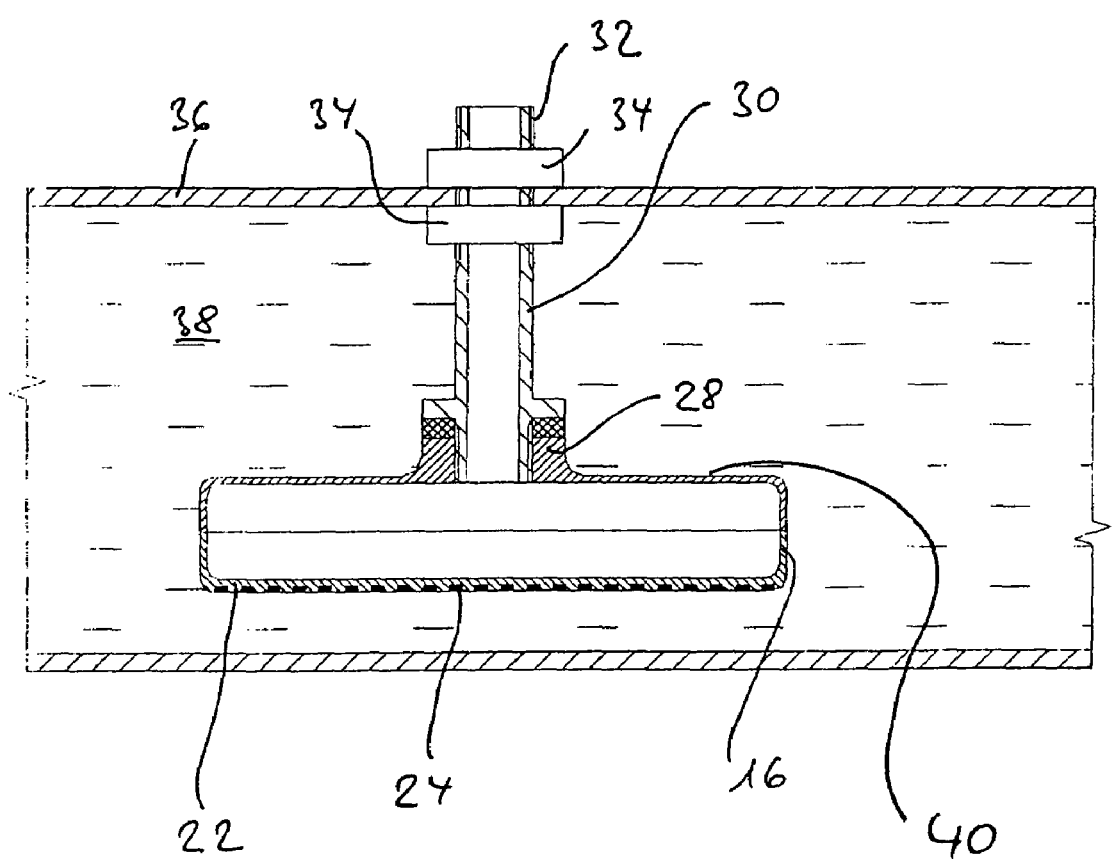
FIG. 3: a second embodiment of the present invention with a discoid housing held in a holder suspended in the container.

A further implementation form is shown in FIG. 3 as a second embodiment. Here, a hollow cylindrical holder 30, which engages with an external thread in the neck 28 of the housing, and which at the other end is held with external thread sections 32 and a pair of nuts 34 in a covering surface 36 of a container 38, holds the housing 16 suspended so that the schematically indicated water mass washes around the housing 16.

While the embodiment shown in FIG. 3, like the embodiment according to FIGS. 1 and 2, only has the electrode arrangement 24 on one outer surface 22, the provision of an electrode arrangement also on the other outer surfaces and in particular on the opposite neck-side outer surface 40, maybe enabling a through contact in the edge region, is possible in particular in the implementation of FIG. 3, and included in the invention.

As a result of the hollow cylindrical inner form, the holder 30 further offers a simple possibility for supplying supply voltage and/or external control signals to the electronics held in the interior of the housing 16.

The present invention is not restricted to the described embodiments or manufacturing possibilities for the implementation. Not only should an appropriate selection be made for the possible material for the electrode arrangement and its form according to the area of application, but the provision of further electrode surfaces in the region of the electrode arrangement or on other suitable water contact surfaces of the housing 16, in particular for a (separate) dechlorination or water enrichment with beneficial ions such as magnesium, zinc, calcium or similar, is also provided.

The indicated discoid housing is also not restricted to the cylindrical shape; also feasible, and also covered by the invention, is the use of other outer shapes, e.g. rectangular, for the discoid housing, depending particularly on a respective container to be used. In addition, not shown in the figures, the container can be supplied with numerous further aggregates and functional units, enclosed filter units, heating or cooling elements and similar.

In the result, the present invention enables, in a surprisingly simple and flexible manner, a device for water decontamination to be created, which is not only simple and flexible to use and exchange, optimizing the space requirement and the effective feed surfaces for the electrical signals into the water to be cleaned, but the present invention also offers, as illustrated in examples in the figures, great potential for improved and therefore more efficient manufacturing.

The invention claimed is:

1. A device for treating water, comprising a container holding a quantity of water intended for treatment, electrode means for pulsing the quantity of water in the container, said electrode means being connected to and operable with an electrical signal generating means, a discoid housing removably provided in the container, wherein the electrode arrangement is provided on a flat outer side of the housing, and the electrical signal-generating means is provided in an interior of the housing.

2. A device according to claim 1, wherein the container is formed as a pot-shaped fluid vessel and the housing is provided in the base of the fluid vessel in such a way that the flat outer side forms an effective floor for the water.

3. A device according to claim 1, wherein a holder for detachable fixing of the housing in the container is associated with the housing, and is formed such that when the container is filled the flat outer side of the housing is in contact with the water.

4. A device according to claim 3, wherein the holder is rod-shaped and is formed to route supply voltage from an external unit to the electrical signal-generating means.

5. A device according to claim 3, wherein the holder is formed to be adjustable in height to change position of the housing in water.

6. A device according to claim 1, wherein the electrode means has a material that is selected from the group consisting of a stainless steel alloy, iron-silicon alloy, magnesium-zinc-calcium alloy, gold, silver, palladium, platinum, titanium, carbon, graphite, a semiconductor material, a conductive synthetic material, and glass and has a thickness of between 0.2 mm and 5 mm.

7. A device according to claim 6, wherein the electrode means is in one of elongated linear, circular, spiral, flat, and pin.

8. A device according to claim 6, wherein the electrode means is formed on one flat side of a disc element with one of plastic, polytetraluorothylene, glass, aluminum oxide and ceramic, and the opposite flat side includes means for fixing electronic components of the electrical signal-generating means.

9. A device according to claim 1, wherein the electrical signal-generating means is operable with low voltage and generates an electrical alternating signal between electrodes of the electrode means with a maximum amplitude<50V and a signal frequency in the range between 1 and 500 kHz, in particular 5 to 50 kHz, the signal-generating means having settings means for automatic changing of a maximum amplitude, an amplitude swing and/or a signal/pause ratio of the alternating signal, dependent on a conductivity of the water mass, and means preferably being provided for short-circuiting the electrodes during a pause in the electrical alternating signal.

10. A device according to claim 1, wherein the electrode means additionally has a dechlorination electrode causing a dechlorination of the water mass and/or an ion enrichment electrode for Mg, Zn, Ca or Ag, or a dechlorination electrode.

11. A device according to claim 10, wherein the dechlorination electrode has an alloy with Mg, Zn or Ca, or an alloy with Fe, Zn, Fe—Cr—Ni.

12. A device according to claim 11, wherein means for triggering the dechlorination electrode as anode as a unit of the electrical signal-generating means for generating a voltage between 2V and 24V, and a current between 5 and 100 mA, are provided in the housing such that they, at regular intervals before or after a signal application to the electrode means by the signal-generating device, or independently thereof, perform a dechlorination operation on the water in the container.

13. A device according to claim 1, including a mechanically operative filter unit pre-connected to a container inlet of the container and to a container outlet of the container.

14. A device according to claim 13, wherein the filter unit is formed as a one-way filter, has a matrix of porous material, and on the matrix absorption means.

15. A device according to claim 1, wherein temperature adjustment means is provided on the container for selective changing temperature of the water mass.

16. A device according to claim 1, wherein the discoid housing is adapted for use with a cistern for drinking water.

* * * * *